Oct. 10, 1967            R. LUCIEN            3,346,218
RETRACTION OF FUSELAGE UNDER-CARRIAGES WITH WHEELS
ARRANGED IN DIABOLO MOUNTING
Filed Jan. 10, 1966
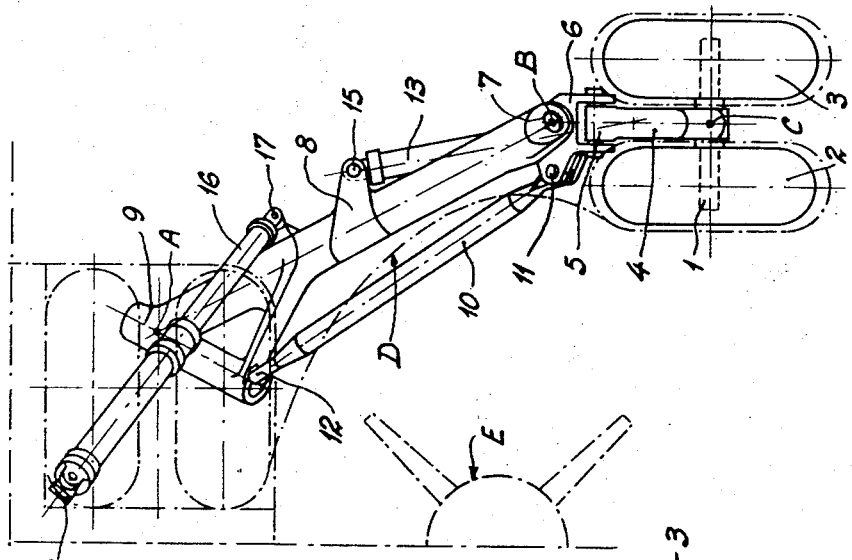
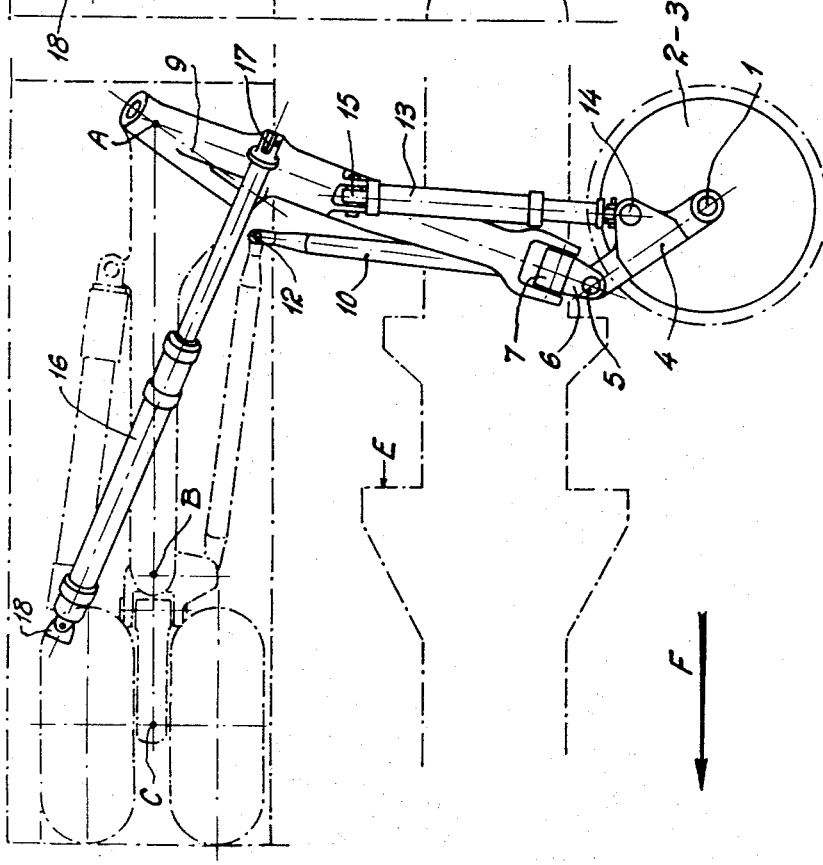

United States Patent Office 3,346,218
Patented Oct. 10, 1967

3,346,218
RETRACTION OF FUSELAGE UNDER-CAR-
RIAGES WITH WHEELS ARRANGED IN
DIABOLO MOUNTING
Rene Lucien, Neuilly-sur-Seine, France, assignor to Recherches Etudes Production R.E.P., Paris, France
Filed Jan. 10, 1966, Ser. No. 519,751
Claims priority, application France, Mar. 15, 1965, 9,313
8 Claims. (Cl. 244—102)

ABSTRACT OF THE DISCLOSURE

A retractable aircraft landing gear with wheels in tandem, the wheels mounted on a rocking lever which is connected by means of a cardan joint to one end of a leg casing, the leg casing having an inclined hinge at its other end attached to the aircraft fuselage to permit pivotal movement of the leg casing and wheels, the landing gear also including a radius rod pivotally connected at one end to the cardan joint and at the other end to the aircraft fuselage at a point not aligned with the pivotal axis of the hinge, the radius rod permitting the wheels, during retraction and protraction of the landing gear, to describe a trajectory which will avoid interference between the landing gear and a load slung under the fuselage.

---

The present invention relates to the retraction of fuselage under-carriages with wheels mounted in tandem.

When it is not possible to fix the landing-gear under the wings of an aircraft, use is made of "fuselage under-carriages," that is to say under-carriages arranged and articulated in such manner that during flight they are completely housed in the fuselage of the aircraft, by pivotal movement about an articulation hinge, which is in turn housed in the fuselage.

The lifting and retraction of the wheels of such landing gear present, however, complicated problems by reason of the necessity of combining a minimum space occupied by the retracted under-carriage with sufficient stability of the aircraft in the "under-carriage down" position.

In fact, in order that the retracted wheel may occupy a minimum space, it would in theory be sufficient for the articulation hinge of the under-carriage leg on the fuselage to be perpendicular to the plane of symmetry of the aircraft, but it is clear that in this case, the track, that is to say the distance between the left-hand under-carriage and the right-hand under-carriage would be much too narrow to correctly ensure the stability of the aircraft.

In order to overcome this drawback, the solution generally proposed consists of judiciously inclining the articulation hinge of the under-carriage with respect to the central plane of the fuselage, but it then becomes necessary to locate the articulation hinge on the outside of the fuselage and the wheels are then housed obliquely in the fuselage, which has the effect of increasing the space required for housing them.

The invention has for its object an improvement in landing-gear of this type, which overcomes the above-mentioned drawback.

In its principle, the invention consists of rocking the tandem wheels about an axis parallel to the plane of symmetry of the aircraft during the lifting of the under-carriage, so as to bring the leg of the under-carriage and the wheels into alignment, that is to say to eliminate the angle which is necessarily formed between these members in the "under-carriage down" position, since the leg is then directed obliquely while the wheels are perpendicular to the ground.

In order to obtain this result, in accordance with the invention, the common axle of the tandem wheels is mounted on a rocking lever coupled by a shaft to a cardan which is in turn coupled by a second shaft perpendicular to the first, to the leg casing which is articulated in known manner by a hinge on the aircraft and coupled to the rocking lever by a damping jack.

The cardan is hingeably mounted on the extremity of a rod, the other extremity of which is mounted on the aircraft outside the hinge. The lifting of the under-carriage is actuated by a bracing jack, of which one member, for example the cylinder, is carried by the aircraft, while the other member, for example the piston rod, actuates the leg casing, the said jack being provided with a locking system so as to ensure the bracing of the landing-gear in the "under-carriage down" position.

During the course of lifting, the cardan pivots in such manner as to bring into parallelism the axes of the leg casing and the rocking lever, which thus appear in alignment when viewed in profile. In the "under-carriage up" position, the wheels can thus be aligned with the leg and can be arranged flat inside a housing, the height of which is governed solely by their size and the volume of which is thus a minimum.

With such a lifting system, it is possible to utilize an inclined articulation hingle which is located in the interior of the fuselage of the aircraft in which are housed all the parts of the under-carriage.

In accordance with an advantageous feature of the invention, the relative positions of the various parts of the under-carriage may be such that the envelope of the trajectory of that wheel of the pair which is nearest to the plane of symmetry of the fuselage has its concave portion turned towards this plane, so as to make it possible to house a load under the fuselage without the load interfering with the under-carriage during the course of its retraction.

One form of construction of a fuselage under-carriage according to the invention, with wheels drawn out, arranged adjacent one another and lifting towards the front, is described below by way of nonlimitative example, reference being made to the accompanying drawings.

In these drawings:

FIG. 1 is a profile view of the left-hand under-carriage of the landing gear in the "under-carriage down" position (in full lines) and the "under-carriage retracted" position (in chain-dotted lines).

FIG. 2 is a front view of the same landing-gear in the "under-carriage down" position (full lines) and in the "under-carriage up" position (chain-dotted lines).

For the sake of clearness, only the parts of the landing-gear necessary for the clear understanding of the invention have been shown in the drawings, and only the left-hand under-carriage has been illustrated, the right-hand under-carriage being deduced from it by symmetry with respect to the central longitudinal plane of the fuselage.

An axle 1, common to two tandem wheels 2 and 3, is mounted on a rocking lever 4 articulated by a shaft 5 on a cardan joint 6, in turn articulated by a second shaft 7 on the leg casing 8, the shafts 5 and 7 being perpendicular to each other. The leg casing is articulated on the aircraft by a hinge 9, inclined towards the ground in the direction of the front of the fuselage (arrow F), and turned in this same direction towards the plane of symmetry of the aircraft.

A rigid bar 10 is hinged at one extremity to the cardan joint 6, through the intermediary of a shaft 11, and is articulated at the other extremity at 12 on the aircraft.

The damping or shock-absorber jack 13 is coupled in known manner to the rocking lever 4 by a shaft 14, and to the leg casing 8 by a shaft 15.

A bracing jack 16 is articulated on the one hand on the leg casing at 17, and on the other hand on the aircraft at 18. This bracing jack ensures the rigidity of the under-carriage in the "under-carriage down" position and actuates its lifting, as will be explained below.

This jack having previously been unlocked, the piston rod is caused to pass into the cylinder and thus the rotation of the leg casing 8 is effected about the hinge 9.

As the pivotal point 12 of the bar 10 is not located on the hinge 9 but on the aircraft, this bar causes the cardan joint 6 to rock, which lifts the wheels 2 and 3 in such manner that the axis A–B of the casing and the axis B–C of the rocking lever, which are not aligned in the "under-carriage down" position, are brought parallel at the end of the lifting movement and in profile view (FIG. 1) appear perfectly aligned in the "under-carriage up" position.

During the lifting of the under-carriage, the shock-absorber jack 13 remains off-pressure and thus maintains the rocking lever at each instant in a perfectly definite position.

It should be noted that by reason of the inclination of the hinge 9, as described above, and in the relative positions of the bar 10, of the bracing jack 16 and of the various articulations, the trajectory envelope D of the inner wheel 2 is a curve, the concave part of which is turned towards the plane of symmetry of the fuselage. It is thus possible to accommodate a load E under the fuselage and in its plane of symmetry, without this load interfering with the under-carriage during the course of its retraction.

The invention is obviously applicable to the fuselage under-carriages which are not provided with tandem wheels. It has been described with reference to this particular case, solely because the problems of size of the wheels are the most difficult to solve.

What I claim is:

1. A lifting system for a fuselage under-carriage with wheels arranged in tandem, said system comprising a common axle supporting said wheels, an under-carriage leg casing, a lifting hinge secured with said leg casing and articulated to said fuselage for pivotal movement about an axis, said lifting hinge being housed inside the fuselage and inclined with respect to the plane of symmetry of the fuselage, a rocking lever carrying the axle of said wheels, a cardan joint connecting said casing and said rocking lever, a rigid rod having one end hingeably attached to said cardan joint and an opposite end connected to the fuselage for pivotal movement about an axis which is nonaligned with the axis of pivotal movement of the lifting hinge, and a bracing jack connected to the fuselage and the casing for pivotably moving the casing about the axis of said hinge.

2. A system as claimed in claim 1, wherein said axis of the lifting hinge is inclined inwardly and forwardly with respect to the plane of symmetry of the fuselage.

3. A system as claimed in claim 1, wherein said bracing jack has a lock position when extended and the under-carriage is lowered.

4. A system as claimed in claim 1, comprising a shock absorber jack connected to said casing and the rocking lever.

5. A system as claimed in claim 4, wherein said shock absorber jack is connected to said rocking lever for pivotal movement about an axis disposed behind a plane containing the axis of said axle and the attachment of the cardan joint and said rocking lever.

6. A system as claimed in claim 5, wherein the relative position of said bracing jack, said rigid rod and said lifting hinge is such that the envelope of the trajectory of the wheel nearest to the plane of symmetry of the fuselage is a curve, the concave portion of which is turned towards said plane of symmetry so as to be capable of housing a load under said fuselage without interference with the under-carriage during the course of its retraction.

7. A system as claimed in claim 1, wherein said bracing jack has extended and retracted positions, said under-carriage being lowered when the bracing jack is extended and raised when the bracing jack is retracted.

8. A lifting system for a fuselage under-carriage with wheels arranged in tandem comprising, a common axle supporting said wheels, an under-carriage leg casing articulated on said fuselage by a lifting hinge, and a rocking lever carrying the axle of said wheels, said lifting hinge being housed inside the said fuselage and inclined to the plane of symmetry of the fuselage, a cardan joint hingeably connecting said casing and said rocking lever, means connecting said joint to said fuselage at a fixed distance from the fuselage for movement about an axis which is nonaligned with said lifting hinge and means for pivotably moving said casing about the axis of said lifting hinge.

References Cited

UNITED STATES PATENTS

| 2,963,246 | 12/1960 | Mitrovich | 244—102 |
| 3,038,687 | 6/1962 | Hartel | 244—102 |

FOREIGN PATENTS

| 806,024 | 12/1958 | Great Britain. |
| 860,432 | 2/1961 | Great Britain. |

FERGUS S. MIDDLETON, *Primary Examiner.*

MILTON BUCHLER, *Examiner.*

P. E. SAUBERER, *Assistant Examiner.*